(12) United States Patent
Betzmeir

(10) Patent No.: US 7,739,928 B2
(45) Date of Patent: Jun. 22, 2010

(54) CONNECTING ROD FOR PISTON ENGINE

(75) Inventor: Helmut Betzmeir, Ottobrunn (DE)

(73) Assignee: Neander Motors AG, Kiel (DE)

( * ) Notice: Subject to any disclaimer, the term of this patent is extended or adjusted under 35 U.S.C. 154(b) by 0 days.

(21) Appl. No.: 11/583,377

(22) Filed: Oct. 18, 2006

(65) Prior Publication Data

US 2007/0137422 A1    Jun. 21, 2007

(30) Foreign Application Priority Data

Oct. 20, 2005    (DE)    ............ 10 2005 050 333

(51) Int. Cl.
*F16C 7/02*    (2006.01)
(52) U.S. Cl. .................................... 74/579 E
(58) Field of Classification Search ............. 74/579 R, 74/579 E, 580, 581, 587, 588
See application file for complete search history.

(56) References Cited

U.S. PATENT DOCUMENTS

| 334,418 | A | * | 1/1886 | Drake | 403/152 |
|---|---|---|---|---|---|
| 1,254,345 | A | * | 1/1918 | Nowosielski | 74/588 |
| 1,610,137 | A | * | 12/1926 | Kratsch | 74/583 |
| 1,821,685 | A | * | 9/1931 | Butler | 123/45 R |
| 2,068,750 | A | * | 1/1937 | Lee | 74/580 |
| 2,146,493 | A | * | 2/1939 | Wintzer | 384/430 |
| 3,338,113 | A | * | 8/1967 | Camp et al. | 74/579 R |
| 4,770,058 | A | * | 9/1988 | Lilie et al. | 74/579 E |
| 4,805,483 | A | * | 2/1989 | Beckmann et al. | 74/579 E |
| 5,595,147 | A | * | 1/1997 | Feuling | 123/52.4 |
| 5,660,086 | A | * | 8/1997 | Carey | 74/579 E |

FOREIGN PATENT DOCUMENTS

| DE | 1775160 | 7/1970 |
|---|---|---|
| DE | 19844991 A1 | 3/2000 |
| DE | 10046214 C1 | 4/2002 |
| DE | 69823366 T2 | 5/2005 |
| FR | 1596918 | 7/1970 |
| JP | 60257938 A | 12/1985 |
| WO | WO 90/14185 A1 | 11/1990 |
| WO | WO 99/57437 A1 | 11/1999 |

* cited by examiner

*Primary Examiner*—Vicky A Johnson
(74) *Attorney, Agent, or Firm*—Townsend and Townsend and Crew, LLP

(57) ABSTRACT

A connecting rod for a piston engine, in particular a twin crankshaft piston engine, with a first connecting rod head (2) that comprises a first connecting rod eye (20) for mounting a connecting rod (1) to a piston (52) of the piston engine. A second connecting rod head (3) has a second connecting rod eye (30) for mounting the connecting rod (1) to the crankpin (58; 59) of a crankshaft (60; 61) of the piston engine, along with a connecting rod shank (4) that links the first connecting rod head (2) and the second connecting rod head (3). The connecting rod shank (4) has a narrow first connecting rod shank section (40) adjacent to the first connecting rod head (4) and the connecting rod shank (4) includes a wider second connecting rod shank section (45) adjacent to the second connecting rod head (3). The first connecting rod shank section (40) and the second connecting rod shank section (45) merge with one another in a step-like manner and the narrow first connecting rod shank section (40) is narrower in the region in which it merges with the first connecting rod head (2) than the exterior diameter (D) of the first connecting rod head (2).

10 Claims, 2 Drawing Sheets

CONNECTING ROD FOR PISTON ENGINE

BACKGROUND OF THE INVENTION

This invention concerns a connecting rod for a piston engine and in particular for a twin crankshaft piston engine.

In piston engines that have a long stroke-to-bore ratio, the connecting rods must be long and narrow so that they do not collide with the lower peripheral edge of the cylinder. Such long and narrow connecting rods, however, are more likely to buckle than wider connecting rods.

Particularly when connecting rods are intended for use in twin crankshaft piston engines where both crankshafts are laterally offset to one another in relation to a center-line of the cylinder, the connecting rods enter the cylinder from the side at a flatter angle than is the case with piston engines with only one crankshaft, so that out of principle there is a higher risk that they will collide with the lower cylinder edge. Connecting rods therefore need to be even narrower for twin crankshaft piston engines. There have been considerations in the prior art to manufacture curved connecting rods for twin crankshaft piston engines. Such a curved connection rod is, for example, known from DE-AS 1 775 160. Curved connecting rods of this kind, however, are questionable from a statistical point of view, particularly with regard to high-performance piston engines.

FR-A 1 596 918, for instance, establishes a connecting rod with a narrow shank section at the piston end and a wider shank section at the crankshaft end, wherein the shank sections are bordered by surrounding ribs that run in the direction of the axes of the eyes of the connecting rod. These surrounding stakes, however, cover almost the entire thickness of the connecting rod and increase the risk of the lateral edges of the ribs of the connecting rod coming into contact with the circular lower peripheral edge of the cylinder.

SUMMARY OF THE INVENTION

An object of the present invention is to provide a generic connecting rod that possesses a high level of resistance to buckling and which can enter the cylinder at a relatively flat angle, making it particularly suitable for use in twin crankshaft piston engines.

The step-like transition section between the first section of the connecting rod shank and the second section of the connecting rod shank ensures that the width of the second section of the connecting rod shank up to just before the first section of the connecting rod shank starts is sufficient enough to ensure that the second section of the connecting rod shank has a high resistance to buckling. Therefore it is only the first section of the connecting rod shank that tapers at the piston end, with which the connecting rod enters the cylinder. The fact that the narrow first section of the connecting rod shank at the point at which it merges with the head of the first connecting rod is narrower than the exterior diameter of the connecting rod head also results in that the width of the connecting rod shank is particularly narrow in the region which enters the cylinder, thus significantly reducing the risk of the connecting rod colliding with the lower peripheral edge of the cylinder.

It is preferable for the length of the first section of the connecting rod shank to be equal to or less than the length of the second section of the connecting rod shank. This enables one to significantly reduce that part of the connecting rod, in comparison with conventional connecting rods, that is particularly prone to a risk of buckling.

Preferably a transition section is provided in the region in which the first section of the connecting rod shank merges with the second section of the connecting rod shank, within which the width of the second section of the connecting rod shank in relation to the width of the first section of the connecting rod shank decreases in a step-like manner in the direction of the longitudinal extension of the connecting rod shank, yet this decrease is gradual. This further development of the connecting rod according to this invention has the advantage of significantly reducing the risk of the connecting rod buckling in the transition section that is between the first and second sections of the connecting rod shank, since the side contour of the connecting rod in this region does not abruptly merge with the next section in a step-like manner but rather leads from the wider second section of the connecting rod shank to the narrower first section of the connecting rod shank in a gradual, step-like manner.

It is particularly advantageous for the first section of the connecting rod shank in the region adjacent to the transition section to be substantially half as wide as the second section of the connection rod shank adjacent to the transition section.

Preferably the first section of the connecting rod shank is provided on at least one frontal side thereof with a reinforcing rib that extends from the head of the first connecting rod along the longitudinal direction of the connecting rod shank, thus increasing the thickness of the connecting rod shank in this section. This reinforces the narrow first section of the connecting rod shank, thus significantly reducing the risk of the connecting rod buckling in this section, particularly if the reinforcement rib is provided on both face sides of the first section of the connecting rod shank.

The reinforcement rib preferably extends into the transition section, or preferably right into the second section of the connecting rod shank adjacent to the transition section. By providing the reinforcing rib on the transition section as well, the risk of buckling of the connecting rod in particular in this section is further reduced. Furthermore, if the reinforcement rib extends into the second section of the connecting rod shank, then bending moments, which are absorbed by the reinforcing rib, can be transferred in a particularly reliable manner to the wider second section of the connecting rod shank, thus further reducing the risk of local buckling of the connecting rod.

If the first section of the connecting rod shank is connected asymmetrically to the second section of the connecting rod shank, relative to a plane that links the axes of the eyes of the connecting rods, this embodiment enables the connecting rod to be inserted into the cylinder at an even flatter angle, since the side of the connecting rod on which the first section of the connecting rod shank meets the second section of the connecting rod shank is situated on that side of the connection rod shank that is averted from the lower peripheral edge of the cylinder.

The connecting rod according to the present invention therefore comprises a reduced buckling length; i.e. that section of the connecting rod that is at a particularly high risk of buckling relative to the entire span of the connecting rod between both axes of the eyes of the connecting rod is reduced to that measure which, at a predefined stroke-to-bore ratio of the piston engine, is absolutely necessary in order to prevent the connecting rod from contacting the lower peripheral edge of the cylinder while in motion.

The connecting rod according to the present invention can be put to use particularly advantageously in a twin crankshaft piston engine, which can be either a combustion engine, a compressor or a pump.

BRIEF DESCRIPTION OF THE DRAWINGS

This invention is explained below by means of an example and with reference to drawings, in which

FIG. 4 is a view similar to FIG. 3 and shows the twin crankshaft piston engine with connecting rods that have asymmetrically connected first and second connecting rod shank sections.

DESCRIPTION OF THE PREFERRED EMBODIMENTS

Figure 1:
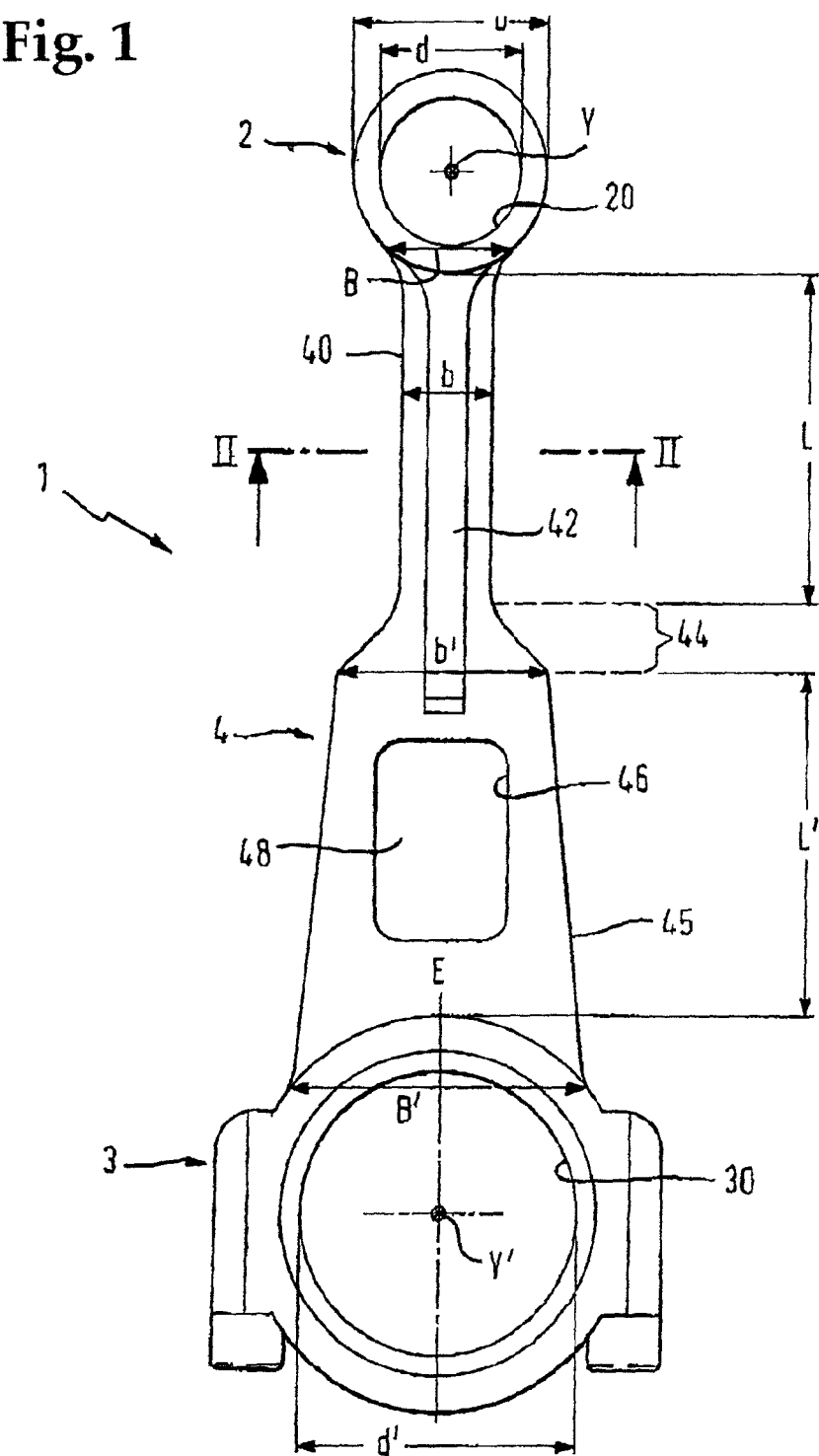
FIG. 1 is a front view of a connecting rod according to the present invention.

FIG. 1 shows a front view of the connecting rod according to the present invention looking in the direction of the Y and Y' axes of the eyes of the connecting rod. Connecting rod 1 comprises a first connecting rod head 2, a second connecting rod head 3 and a connecting rod shank 4 that extends between connecting rod heads 2 and 3. A first connecting rod eye 20 is provided in the first connecting rod head 2 by means of which connecting rod eye 20 the connecting rod can be swivel-mounted to a piston in a piston engine in the usual way.

The second connecting rod head 2, which is either divided or undivided in the usual way, has a second connecting rod eye 30 by means of which connecting rod 1 can be swivel-mounted to the crankpin of a crankshaft in a piston engine in the usual way.

Connecting rod shank 4, which extends between connecting rod eyes 2 and 3, comprises two connecting rod shank sections 40 and 45 which merge into one another in a step-like manner around the middle section of the connecting rod shank. The first connecting rod shank section 40 is adjacent to the first connecting rod head at the piston end, whereas the second connecting rod shank section 45 is adjacent to connecting rod head 3 at the crankshaft end.

Width B of the first connecting rod shank section 40, which is measured in one direction perpendicular to a plane that links the Y and Y' axes of the eyes of the connecting rod, i.e. from left to right in FIG. 1, is less in the region in which the first connecting rod shank section 40 merges with the first connecting rod head 2 than the exterior diameter D of the first connecting rod head 2 measured in the same direction. In the example shown, width B is actually even less than the interior diameter d of the first connecting rod eye 20.

The second connecting rod shank section 45 is considerably wider than the first connecting rod shank section 40. Width B' of the second connecting rod shank section 45 is greater where the second connecting rod shank section 45 merges with the second connecting rod head 3 than the interior diameter d' of the second connecting rod eye 30. From here the width of the second connecting rod shank section 45 decreases at a flat angle to plane E, which links the Y and Y' axes of the connecting rod eyes, in the direction towards the first connecting rod shank section 40.

The first connecting rod shank section 40 and the second connecting rod shank section 45 merge into one another in a transition section 44 located around the middle of the longitudinal extension of connecting rod shank 4. The side contour of connecting rod shank 4 changes in the transition section 44 to the extent that it assumes a steeper angle in relation to plane E, so as to permit the differing widths of both connecting rod shank sections 40 and 45 to gradually merge with one another, this steeper angle as shown in the example being around 45 degrees.

The first connecting rod shank section 40 has an almost consistent width b along its entire length, which is less than width B in the region in which it merges with the first connecting rod head 2. As already mentioned, on the other hand, the width of the second connecting rod shank section decreases from the second connecting rod head 3 to the transition section 44. Width b' of the second connecting rod shank section 45, measured at the border to transition section 44 and defined by the change in angle in the side contour of the shank, is around twice that of width b of the first connecting rod shank section.

The length L of the first connecting rod shank section 4 measured from the lower edge of the first connecting rod head 2 to the boundary between the first connecting rod shank section 40 and the transition section 44, this boundary being defined by the change in angle in the side contour of the shank, is less than or equal to length L' of the second connecting rod shank section 45 measured from the upper edge of the second connecting rod head 3 to the boundary between the second connecting rod shank section 45 and the transition section 44.

Figure 2:
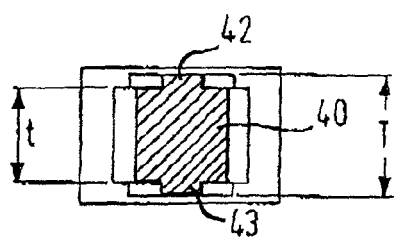
FIG. 2 is a cross-section of the narrower section of the connecting rod shank along the line II-II in FIG. 1.

The top and bottom sides—in relation to the drawing plane in FIG. 1—of the first connecting rod shank section 40 are each fitted with one reinforcement rib 42 or 43 that runs longitudinally along the connecting rod shank 4 as shown in the cross-section drawing in FIG. 2. The relevant reinforcement rib 42 or 43 runs from the first connecting rod head 2 over the transition section 44 and into the second connecting rod shank section 45 and ends in the vicinity of the transition section 44. This way the thickness t of the connecting rod shank 4 in the region in which the reinforcement ribs 42 and 43 are fitted is increased to a thickness T, thus increasing the flexural strength of connecting rod shank 4 in the reinforced section.

In order to save on weight, the second connecting rod shank section 45 can be furnished with an internal recess 46 which is formed either as an aperture, thus representing an opening, or as a reduction in thickness t of the second connecting rod shank section 45, wherein a recess is provided on both end faces between which a thin wall 48 remains.

Although the connecting rod 1 shown in FIG. 1 is symmetrical to plane E with respect to connecting rod shank 4, the connecting rod shank 4 can also be formed such that in relation to plane E the first connecting rod shank section 40 merges into the second connecting rod shank section 45 in a laterally offset manner, thus creating an asymmetrical connecting rod.

Figure 3:
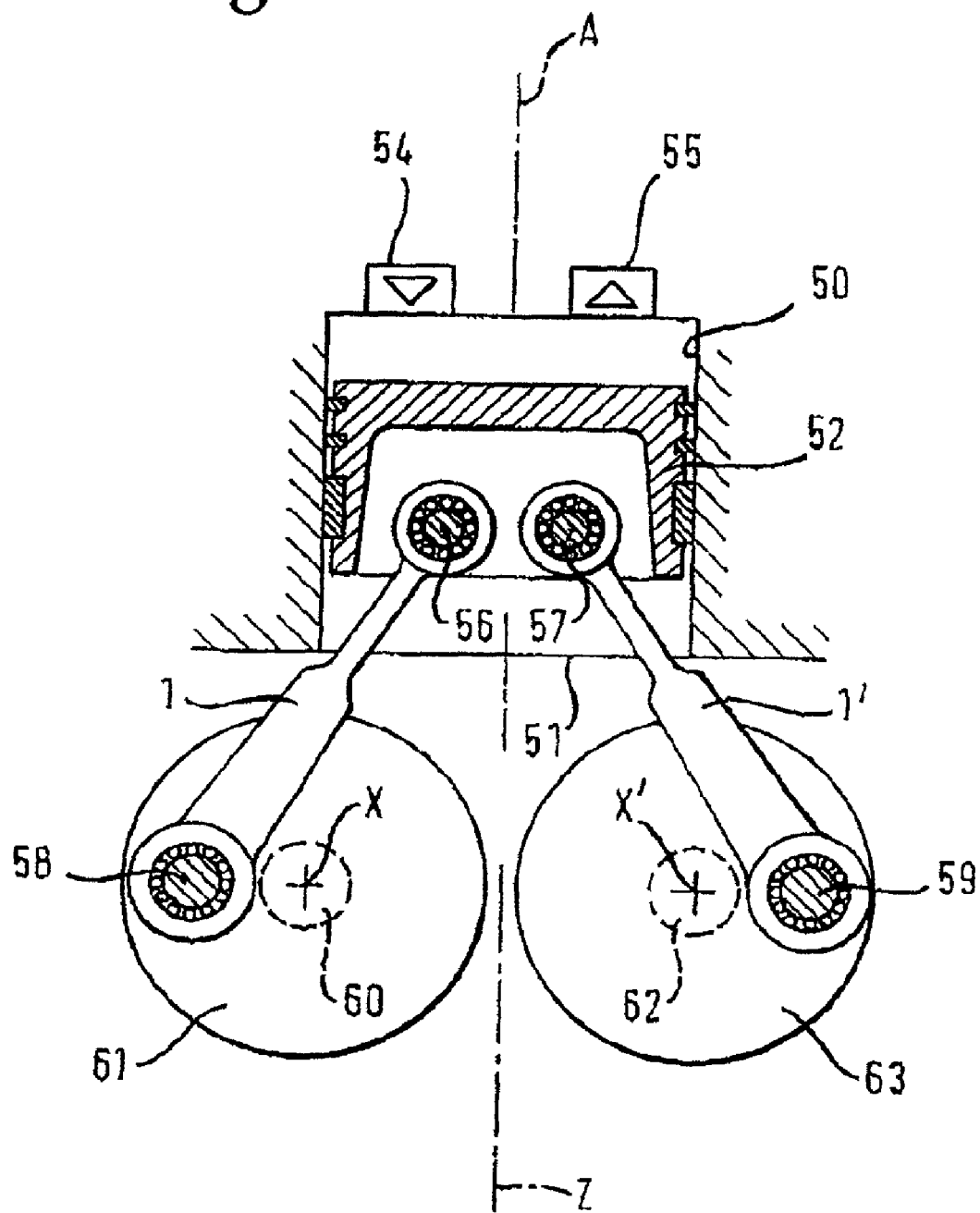
FIG. 3 is a front view of a twin crankshaft piston engine using the connecting rod according to the present invention.

FIG. 3 shows a diagrammatic front view of a twin crankshaft piston engine provided with connecting rods according to the invention. A piston 52 is reciprocably movably provided in a cylinder 50. A compression chamber is contained within the wall of cylinder 50 and the upper frontal plane of the piston head. Cylinder 50 comprises an inlet valve 54 and an outlet valve 55, both of which are shown on the diagram, which connect the compression chamber with the inlet duct (not shown) and the outlet duct (not shown).

That bottom end of piston 52 which is averted from the piston head is provided with two connecting rod pins 56, 57 that are laterally offset to one another in relation to cylinder axis A. A bearing is provided on each of the connecting rod pins 56, 57 wherein a connecting rod 1, 1' according to this invention is swivel-mounted on each bearing at the stroke piston 52.

The second end of each connecting rod 1, 1' is swivel-mounted on an associated crankpin 58, 59. The first crankpin 58 is provided on a crank disk 61 which is connected to the first crankshaft 60, and the second crankpin 59 is provided on a crank disk 63 which is connected to a second crankshaft 62. The first crankshaft 60 and the second crankshaft 62 run parallel to one another and are synchronized to turn in opposite directions. Rotational axes X, X' of both crankshafts 60, 62 run parallel to a cylinder mid-plane Z and are laterally symmetrically offset in relation to this cylinder mid-plane Z.

FIG. 3 illustrates that the provision of connecting rods 1, 1' in accordance with this invention allows a very flat design of the twin crankshaft piston engine, since the narrower first connecting rod shank section at the piston end enables connecting rods 1, 1' to enter cylinder 50 from the side at a flatter angle without their colliding with the lower peripheral edge 51 of the cylinder.

This invention is not limited to the above embodiment, the purpose of which is merely to serve as a general illustration of the central idea behind the invention. Within the bounds of the scope of protection the device according to the present invention can in fact take on other constructions than those detailed above. In this respect, the device may in particular have characteristics that represent a combination of the relevant individual features in the claims.

References in the claims, the description and the drawings are merely for the purpose of making the invention easier to understand and are not intended to restrict the scope of protection.

The invention claimed is:

1. A connecting rod for a piston engine comprising
a first connecting rod head that comprises a first connecting rod eye for mounting a connecting rod to a piston of the piston engine;
a second connecting rod head that comprises a second connecting rod eye for mounting said connecting rod to the crankpin of a crankshaft of the piston engine; and
a connecting rod shank that links the first connecting rod head with the second connecting rod head,
the connecting rod shank comprising a narrow first connecting rod shank section adjacent to the first connecting rod head,
the connecting rod shank comprising a second connecting rod shank section adjacent to the second connecting rod head,
the first connecting rod shank section and the second connecting rod shank section merging into one another in a transition section,
wherein a length L of the first connecting rod shank section is measured from a lower edge of the first connecting rod head to a boundary between the first connecting rod shank section and the transition section,
wherein a length L' of the second connecting rod shank section is measured from an upper edge of the second connecting rod head to a boundary between the second connecting rod shank section and the transition section,
said boundaries being defined by a change in angle in the side contour of the shank,
said first connecting rod shank section having a cross-section of solid material,
the length L of said narrow first connecting rod shank section being equal to or less than the length L' of said second connecting rod shank section,
the second connecting rod shank section being wider than the narrow first connecting rod shank section,
wherein a width b of the narrow first connecting rod shank section measured at said boundary between the narrow first connecting rod shank section and the transition section is narrower than a width b' of the second connecting rod shank section measured at said boundary between the second connecting rod shank section and the transition section,
wherein said transition section has a width which gradually decreases in the direction of a longitudinal extension of said connecting rod shank from said width b' of said second connecting rod shank section to said width b of said narrow first connecting rod shank section,
wherein said width b of the narrow first connecting rod shank section is narrower in a region where it merges with the first connection rod head than an exterior diameter of the first connecting rod head.

2. A connecting rod for a piston engine in accordance with claim 1, wherein said width b of said narrow first connecting rod shank section is substantially half as wide as said width b' of said second connecting rod shank section.

3. A connecting rod for a piston engine in accordance with claim 1, wherein at least one face end of said narrow first connecting rod shank section is provided with a reinforcement rib that extends longitudinally from said first connecting rod head along said narrow first connecting rod shank section, and which increases the thickness of said narrow first connecting rod shank in this section.

4. A connecting rod for a piston engine in accordance with claim 3, wherein said reinforcement rib extends into said transition section.

5. A connecting rod for a piston engine in accordance with claim 4 wherein said reinforcement rib extends into said second connecting rod shank section adjacent to said transition section.

6. A connecting rod for a piston engine in accordance with claim 1 wherein the transition section is located around the middle of the longitudinal extension of the connecting rod shank.

7. A twin crankshaft piston engine with at least one piston-cylinder-unit with a piston that can be moved back and forth within a cylinder and two crankshafts synchronized to rotate in opposite directions to one another, wherein the piston is coupled to the first crankshaft via a first connecting rod and to the second crankshaft via a second connecting rod, each of the first and second connecting rods including
a first connecting rod head that comprises a first connecting rod eye for mounting the connecting rod to the piston;
a second connecting rod head that comprises a second connecting rod eye for mounting the connecting rod to a crankpin of the associated crankshaft of the piston engine; and
a connecting rod shank that links the first connecting rod head with the second connecting rod head,
the connecting rod shank comprising a narrow first connecting rod shank section adjacent to the first connecting rod head,
the connecting rod shank comprising a second connecting rod shank section adjacent to the second connecting rod head,
the first connecting rod shank section and the second connecting rod shank section merging into one another in a transition section,
wherein said first connecting rod shank section has a cross-section of solid material,
wherein a length L of the first connecting rod shank section is measured from a lower edge of the first connecting rod head to a boundary between the first connecting rod shank section and the transition section, wherein a length L' of the second connecting rod shank section is measured from an upper edge of the second connecting rod head to a boundary between the second connecting rod shank section and the transition section, said boundaries being defined by a change in angle in the side contour of the shank, the length L of said narrow first connecting rod shank section being equal to or less than the length L' of said second connecting rod shank section, the second connecting rod shank section being wider than the narrow first connecting rod shank section, wherein a width b of the narrow first connecting rod shank section measured at said boundary between the narrow first connecting rod shank section and the transition section is narrower than a width b' of the second connecting rod shank section measured at said boundary between the second connecting rod shank section and the transition section, wherein said transition section has a width which gradually decreases in the direction of a longitudinal extension of said connecting rod shank from said width b' of said second connecting rod shank section to said width b of said narrow first connecting rod shank section, a width of the narrow first connecting rod shank section being narrower in a region where it merges with the first connection rod head than an exterior diameter of the first connecting rod head.

8. A twin crankshaft piston engine in accordance with claim 7, wherein the twin crankshaft piston engine is a combustion engine.

9. A connecting rod for a piston engine comprising a first connecting rod head that comprises a first connecting rod eye for mounting a connecting rod to a piston of the piston engine;

a second connecting rod head that comprises a second connecting rod eye for mounting said connecting rod to the crankpin of a crankshaft of the piston engine; and a connecting rod shank that links the first connecting rod head with the second connecting rod head, the connecting rod shank comprising a narrow first connecting rod shank section adjacent to the first connecting rod head and the connecting rod shank comprising a second connecting rod shank section adjacent to the second connecting rod head, the first connecting rod shank section and the second connecting rod shank section merging into one another in a transition section, said first connecting rod shank section having a cross-section of solid material, wherein a length L of the first connecting rod shank section is measured from a lower edge of the first connecting rod head to a boundary between the first connecting rod shank section and the transition section, wherein a length L' of the second connecting rod shank section is measured from an upper edge of the second connecting rod head to a boundary between the second connecting rod shank section and the transition section, said boundaries being defined by a change in angle in the side contour of the shank, the length L of said narrow first connecting rod shank section being equal to or less than the length L' of said second connecting rod shank section, the second connecting rod shank section being wider than the narrow first connecting rod shank section, wherein a width b of the narrow first connecting rod shank section measured at said boundary between the narrow first connecting rod shank section and the transition section is narrower than a width b' of the second connecting rod shank section measured at said boundary between the second connecting rod shank section and the transition section, wherein said transition section has a width which gradually decreases in the direction of a longitudinal extension of said connecting rod shank from said width b' of said second connecting rod shank section to said width b of said narrow first connecting rod shank section, a width of the narrow first connecting rod shank section being narrower in a region where it merges with the first connection rod head than an exterior diameter of the first connecting rod head, wherein the width of said second connecting rod shank section decreases at a first inclination angle to a plane E, which links the axes of the connecting rod eyes, emanating from a transition region, in which the second connecting rod shank section merges into the second connecting rod head, in the direction towards said narrow first connecting rod shank section.

10. A connecting rod for a piston engine comprising a first connecting rod head that comprises a first connecting rod eye for mounting a connecting rod to a piston of the piston engine;

a second connecting rod head that comprises a second connecting rod eye for mounting said connecting rod to the crankpin of a crankshaft of the piston engine; and a connecting rod shank that links the first connecting rod head with the second connecting rod head, the connecting rod shank comprising a narrow first connecting rod shank section adjacent to the first connecting rod head, the connecting rod shank comprising a second connecting rod shank section adjacent to the second connecting rod head, the first connecting rod shank section and the second connecting rod shank section merging into one another in a transition section, said first connecting rod shank section having a cross-section of solid material, wherein a length L of the first connecting rod shank section is measured from a lower edge of the first connecting rod head to a boundary between the first connecting rod shank section and the transition section, wherein a length L' of the second connecting rod shank section is measured from an upper edge of the second connecting rod head to a boundary between the second connecting rod shank section and the transition section, said boundaries being defined by a change in angle in the side contour of the shank, the length L of said narrow first connecting rod shank section being equal to or less than the length L' of said second connecting rod shank section, the second connecting rod shank section being wider than the narrow first connecting rod shank section, wherein a width b of the narrow first connecting rod shank section measured at said boundary between the narrow first connecting rod shank section and the transition section is narrower than a width b' of the second connecting rod shank section measured at said boundary between the second connecting rod shank section and the transition section, wherein said transition section has a width which gradually decreases in the direction of a longitudinal extension of said connecting rod shank from said width b' of said second connecting rod shank section to said width b of said narrow first connecting rod shank section, a width of the narrow first connecting rod shank section being narrower in a region where it merges with the first connection rod head than an exterior diameter of the first connecting rod head, wherein the width of said second connecting rod shank section decreases at a first inclination angle to a plane E, which links the axes of the connecting rod eyes, emanating from a transition region, in which the second connecting rod shank section merges into the second connecting rod head, in the direction towards said narrow first connecting rod shank section, wherein the width of said transition section decreases at a second inclination angle to said plane E, wherein said second inclination angle is steeper than said first inclination angle with respect to plane E.

* * * * *